(12) United States Patent
Hayashi (10) Patent No.: US 9,191,477 B2
(45) Date of Patent: Nov. 17, 2015

(54) ELECTRONIC DEVICE

(71) Applicant: KYOCERA Corporation, Kyoto (JP)

(72) Inventor: Katsuhito Hayashi, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 94 days.

(21) Appl. No.: 13/626,081

(22) Filed: Sep. 25, 2012

(65) Prior Publication Data

US 2013/0076483 A1    Mar. 28, 2013

(30) Foreign Application Priority Data

Sep. 27, 2011   (JP) ................. 2011-210515

(51) Int. Cl.
   *G05B 19/00*   (2006.01)
   *H04M 1/673*   (2006.01)
   *H04M 1/725*   (2006.01)
(52) U.S. Cl.
   CPC .......... *H04M 1/673* (2013.01); *H04M 1/72522* (2013.01)
(58) Field of Classification Search
   CPC ................................. G07C 9/0069; G06F 3/01
   USPC .................. 340/5.54; 348/207.99, 333.02
   See application file for complete search history.

(56) References Cited

U.S. PATENT DOCUMENTS

| 8,433,759 | B2 * | 4/2013 | Styles et al. .................. 709/205 |
| 8,606,227 | B2 * | 12/2013 | Karam et al. ................ 455/410 |
| 8,630,623 | B2 * | 1/2014 | Park et al. .................... 455/411 |
| 2006/0234764 | A1 | 10/2006 | Gamo et al. |
| 2010/0024020 | A1 * | 1/2010 | Baugher et al. .................. 726/7 |

FOREIGN PATENT DOCUMENTS

| JP | H09-330175 A | 12/1997 |
| JP | 10-161957 A | 6/1998 |
| JP | 2006-303701 A | 11/2006 |
| JP | 2007-122450 A | 5/2007 |

OTHER PUBLICATIONS

Office Action mailed on Jan. 6, 2015 and issued by Japanese Patent Office for Japanese Application No. 2011-210515.
Office Action mailed on Aug. 6, 2015 and issued by Japanese Patent Office for Japanese Patent Application No. 2011-210515.

* cited by examiner

*Primary Examiner* — Vernal Brown (57) ABSTRACT

An electronic device and method for operating an electronic device are presented. An input for performing a predefined function is received. A lock function is deactivated to unlock the predefined function and the predefined function is displayed on a display module, if the input is received and if a correct password is entered.

8 Claims, 12 Drawing Sheets

After entering "2" at the stand-by screen (a)

After entering "2" at the stand-by screen (a)

After a finger touching the "mail icon" at the stand-by screen (a)

After long-pressing the "mail icon" at the stand-by screen (a)

(b)

(c)

ELECTRONIC DEVICE

CROSS-REFERENCE TO RELATED APPLICATION

The present application claims priority under 35 U.S.C. §119 to Japanese Patent Application No. 2011-210515, filed on Sep. 27, 2011, entitled "ELECTRONIC DEVICE". The content of which is incorporated by reference herein in its entirety.

FIELD

Embodiments of the present disclosure relate generally to electronic devices, and more particularly relate to electronic information devices.

BACKGROUND

Many electronic devices that use a key input to enter information (e.g., mobile wireless terminals) include a dial operation prevention function such as a keyboard lock function or a dialing lock function. The dial operation prevention function prevents activation of an operation caused by an accidental touch on a key and/or prevents unauthorized use by an unauthorized user who comes into possession of the electronic device.

SUMMARY

An electronic device and method for operating an electronic device are presented. An input for performing a predefined function is received. A lock function is deactivated to unlock the predefined function and the predefined function is displayed on a display module, if the input is received and if a correct password is entered.

In an embodiment, an electronic device comprises a display module, an input module, and a controller. The input module receives an input for performing a predefined function. The controller deactivates a lock function to unlock the predefined function, if the input is received and if a correct password is entered. The controller further displays the predefined function on the display module, if the input is received and if the correct password is entered.

In another embodiment, a method for operating an electronic device receives an input for performing a predefined function. The method also deactivates a lock function to unlock the predefined function, if the input is received and if a correct password is entered. The method further displays the predefined function on the display module, if the input is received and if the correct password is entered.

In further embodiment, a non-transitory computer readable storage medium comprises computer-executable instructions for operating a mobile electronic device. The computer-executable instructions receive an input for performing a predefined function, and deactivate a lock function to unlock the predefined function, if the input is received and if a correct password is entered. The computer-executable instructions also display the predefined function on the display module, if the input is received and if the correct password is entered.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one non-limiting application, namely, a mobile electronic device such as a mobile phone. Embodiments of the disclosure, however, are not limited to such mobile phone, and the techniques described herein may be utilized in other applications. For example, embodiments may be applicable to digital books, digital cameras, electronic game machines, digital music players, personal digital assistance (PDA), personal handy phone system (PHS), lap top computers, TV's, GPS's or navigation systems, health equipment, iPod™, iPad™, display monitors, or other electronic device.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Many electronic devices that use a key input to enter information (e.g., mobile wireless terminals) include a dial operation prevention function such as a keyboard lock function or a dialing lock function. The dial operation prevention function prevents activation of an operation caused by an accidental touch on a key and/or prevents unauthorized use by an unauthorized user who comes into possession of the electronic device.

A password may be entered to lock and/or unlock the dial operation prevention function. If a user fails to realize that a lock function is active and presses a key for starting up a predefined function, a screen prompting the user to enter a password is displayed. The user then needs to unlock the lock function first and press the key again to start up the predefined function which is inconvenient for the user.

Figure 1:
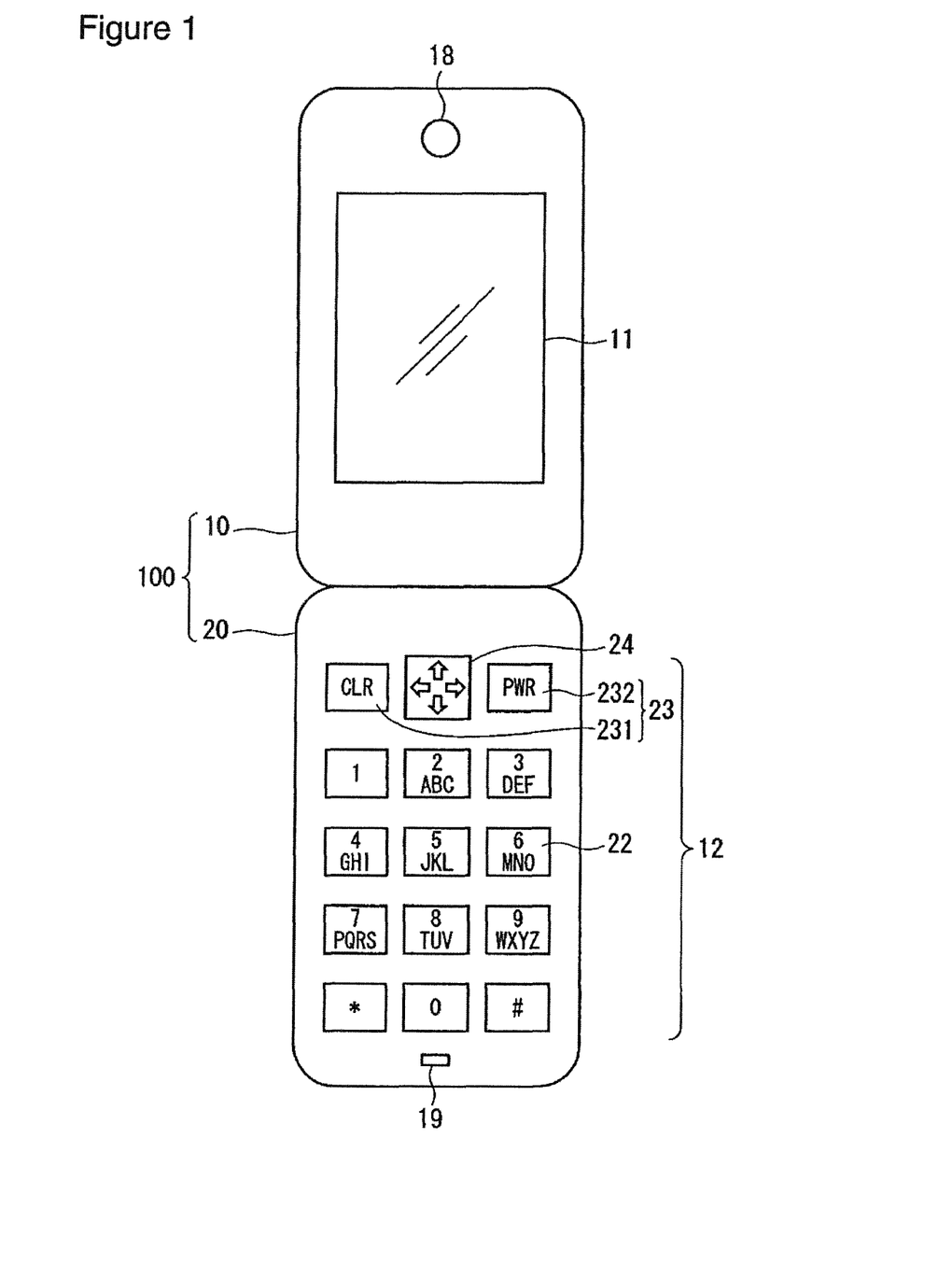
FIG. 1 is an illustration of an exemplary top view of an exterior of mobile wireless terminal in an open state according to the present disclosure.

FIG. 1 is an illustration of an exemplary top view of an exterior of a mobile wireless terminal 100 in an open state according to the present disclosure. As shown in FIG. 1, the mobile wireless terminal 100 comprises a display-side housing 10 of a first housing and an operation-module-side housing 20 of a second housing. For example, the display-side housing 10 and the operation-module-side housing 20 are coupled by a hinge (not shown). The configuration enables the mobile wireless terminal 100 to change its state from an open state to a close state and vice versa.

When the mobile wireless terminal 100 is in an open state, the operation-module-side housing 20 is referred to as a bottom side, and the other side is referred to as an upper side. That is, a hinge couples the display-side housing 10 and the operation-module-side housing 20 so as to enable the housings to open or close at an arbitrary angle. In the closed state, the display-side housing 10 and the operation-module-side housing 20 are disposed on top of each other. In the open state (FIG. 1), the display-side housing 10 and the operation-module-side housing 20 are disposed not to overlap each other.

The operation-module-side housing 20 comprises a key operation module 12 as an input module. The key operation module 12 comprises an input operation key 22, such as a numeric keypad, for entering numbers of a phone number and characters of an email address, a function setting operation key 23 for activating various functions such as a clear key 231, a power key 232, and a enter key 24 for entering a selection on various operations and for scrolling upward/downward or to right and left.

The display-side housing 10 comprises a display module 11, which is exposed when the mobile wireless terminal 100 is opened. The display-side housing 10 also comprises a speaker 18 as an audio output module 18. The speaker 18 is provided in a vicinity of the upper edge of the surface where the display module 11 is provided. The operation-module-side housing 20 comprises a microphone 19 as an audio input module 19. The microphone 19 is provided in the vicinity of a lower edge of a surface where the operation key group is provided.

Figure 2:
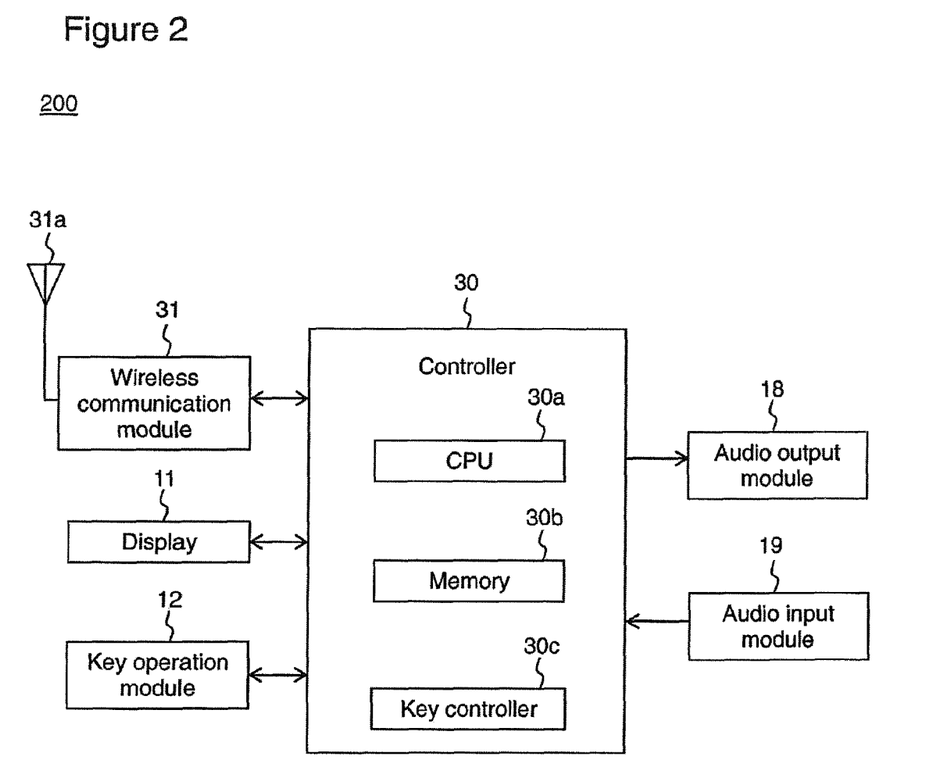
FIG. 2 is an illustration of a functional block diagram a mobile wireless terminal according to the present disclosure.

FIG. 2 is an illustration of a functional block diagram 200 of the mobile wireless device 100 according to the present disclosure. As shown in FIG. 2, the mobile wireless terminal 100 comprises the display module 11, the key operation module 12, the audio output module (the speaker) 18, the audio input module (the microphone) 19, a controller 30, and a wireless communication module 31. The controller 30 and the wireless communication module 31 are housed in the operation-module-side housing 20.

The controller 30 is capable of controlling functions of the mobile wireless terminal 100. For example, the controller 30 is configured to deactivate a lock function to unlock the predefined function, and display the predefined function on the display module 11, if the input is received and if a correct password is entered. The controller 30 comprises a CPU 30a and a memory 30b. The controller 30 processes information entered by key inputs by a plurality of keys of the key operation module 12.

The controller 30 comprises a key controller 30c. While a dial operation prevention function (hereinafter, referred to as a lock function) is active (in a locked state), a key other than a predefined key is configured not to accept a key operation.

The controller 30 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory 30b may be any suitable data storage area with suitable amount of memory that is formatted to support the operation of the mobile wireless terminal 100. Memory 30b is configured to store, maintain, and provide data as needed to support the functionality of the mobile wireless terminal 100 in the manner described below. In some embodiments, the mobile wireless terminal 100 may comprise, for example but without limitation, a non-volatile storage device (non-volatile semiconductor memory, hard disk device, optical disk device, and the like), a random access storage device (for example, SRAM, DRAM), or any other form of storage medium known in the art.

For example, the memory 30b, may comprise a RAM and a flash memory. The RAM is used as a work area (including a drawing area) or as a buffer area for the CPU 30a. A flash memory stores content data of the mobile wireless terminal 100, such as but without limitation, characters, letters, images, audios, sounds, movies, or other content data. The memory 30b may be coupled to the CPU 30a and configured to store, for example but without limitation, an input received by an input module, such as the key operation module 12. For example, when a numeric key is depressed before displaying a password input screen, the memory 30b stores the input entered through the numeric key.

The wireless communication module 31 receives a wireless signal via an antenna 31a from a mobile wireless terminal other than the mobile wireless terminal 100 or from a communication device, such as a web server connected to the Internet. The wireless communication module 31 performs an amplification process or down-convert process on the received signal and outputs the amplified/down-converted signal to the controller 30. The wireless communication module 31 also performs an up-convert process or amplification process on a transmitting signal generated at the controller 30 and wirelessly transmits the processed transmitting signal to a mobile wireless terminal other than the mobile wireless terminal 100 or to a communication device connected to the Internet via the antenna 31*a*.

The audio input module 19 converts audio entered from outside into audio data and outputs the audio data to controller 30. The audio output module 18 converts audio data from the controller 30 into audio and outputs the audio outside.

Controlled by the controller 30, the display module 11 displays a variety of information, such as characters, symbols, graphics, and other information. The mobile wireless terminal 100 described above is shown as a terminal including the display module 11; however, another display may be provided to the surface opposite to where the display module 11 is provided in the display-side-housing 10. The key operation module 12 is described as a module with a button-style keypad, but the key operation module 12 may be configured to include a touch-style keyboard (a software keyboard) implemented by a touch panel function. If the mobile wireless terminal 100 comprises one display, the touch-style keyboard may be displayed on the display. If the mobile wireless terminal 100 comprises a plurality of displays, the touch-style keyboard may be displayed on one of the displays.

Hereinafter, a process of setting a function execution code is described in conjunction with FIGS. 3(A)-(C).

FIG. 3(A) shows a function screen selection window displayed on the display module 11 after a predefined key operation. The function screen selection window presents an item 13 for selecting "Phone" and an item 14 for selecting "Mail." However, they are merely examples.

FIG. 3(A) shows an example of selecting "Mail." When the item 14 is selected and confirmed, a code number setting window, such as a window shown in FIG. 3(B), is displayed. The code number setting window comprises an entry field 15 for entering a code number to be associated with the "Mail," which is selected in the function screen selection window. A predefined number is entered by using a numeric keypad. Here, for example, a code number is set to a single digit number from 0 to 9, and FIG. 3(B) shows an example of setting a code number to "2." When a code number is set to a single-digit number from 0 to 9, up to 10 functions may be performed by function execution codes. A code number may also be set to a two-digit number. A code number is not limited to a number and may comprise, for example, letters from various alphabets or other types of characters.

When a code number is set at the code number setting window, a code/screen list, such as a list shown in FIG. 3(C) is displayed. The code/screen list shows a name of a function screen and a code number associated with the function screen after the association is established and completed. That is, the code number 1 is associated with "Browser," and the code number 2 is associated with "Mail." The code number 3 is not associated with a function. In addition, a code number is not necessarily a consecutive number. A code number may be set based on a user's preference or set to a number that is easy to remember.

By taking the above steps for setting the function execution code, an intended function screen and a code number may be associated with each other, and a user-friendly setting is made possible.

Even if a user presses a key, failing to realize that a lock function is active, the user may start up a predefine function by entering a password without pressing the key again when a screen for prompting to enter a password is displayed which is convenient for the user.

Processes 400, 600, 900 and 1100 for unlocking a lock function are decided below. The various tasks performed in connection with the processes 400, 600, 900 and 1100 described below may be performed by software, hardware, firmware, a computer-readable medium having computer executable instructions for performing the process method, or any combination thereof. The processes 400, 600, 900 and 1100 may be recorded in a computer-readable medium such as a semiconductor memory, a magnetic disk, an optical disk, and the like, and can be accessed and executed, for example, by the controller 30 such as a CPU 30*a*.

It should be appreciated that processes 400, 600, 900 and 1100 may include any number of additional or alternative tasks, the tasks shown in FIGS. 4, 6, 9, and 11 need not be performed in the illustrated order, and processes 400, 600, 900 and 1100 may be incorporated into a more comprehensive procedure or process having additional functionality not described in detail herein. In some embodiments, portions of the processes 400, 600, 900 and 1100 may be performed by different elements of the mobile wireless terminal 100 such as: the wireless communication module 31, the display module 11, the controller 30, the memory 30*b*, etc. Processes 400, 600, 900 and 1100 may have functions, material, and structures that are similar to the embodiments shown in FIGS. 1-3, 5, 7-8, and 10. Therefore common features, functions, and elements may not be redundantly described here.

Figure 4:
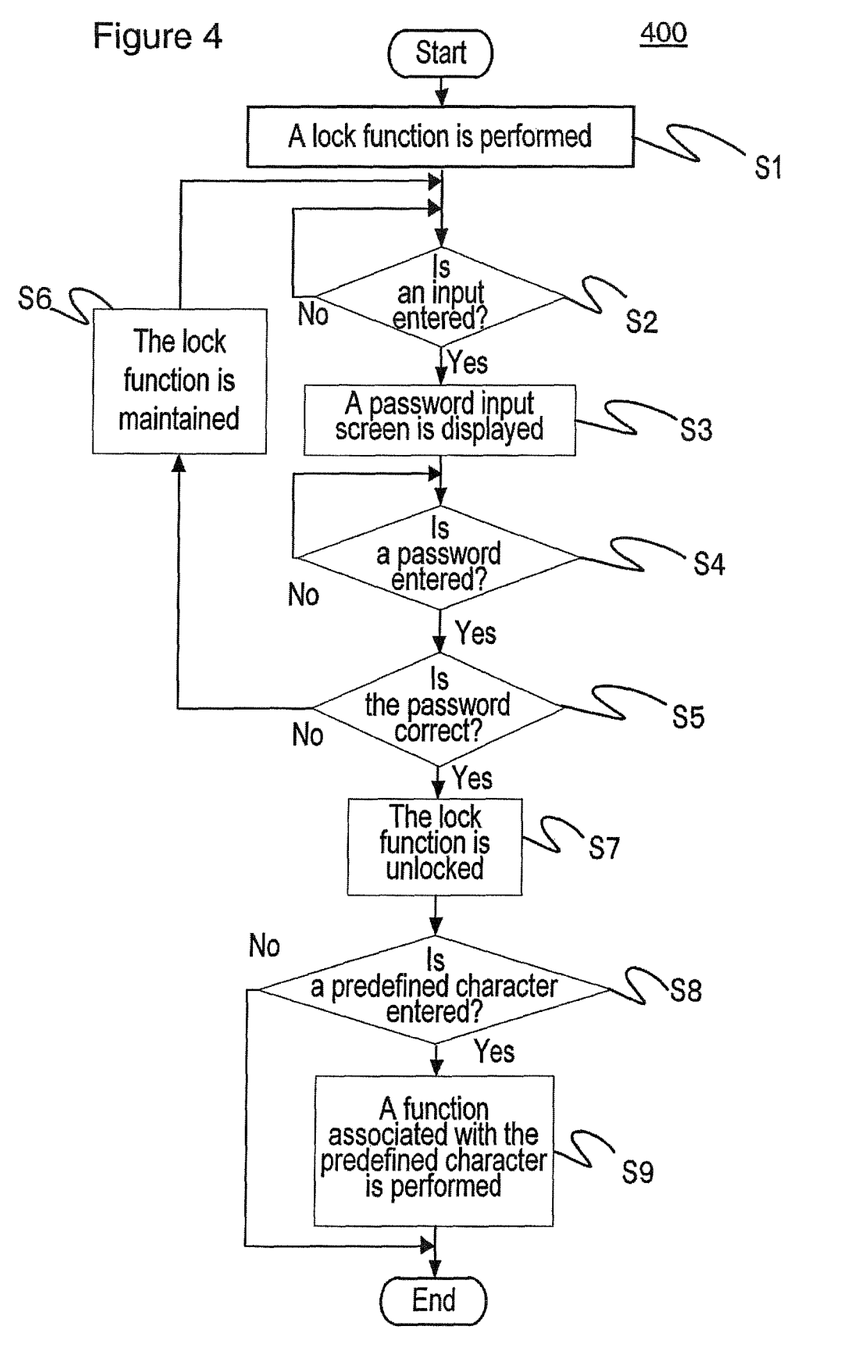
FIG. 4 is a flowchart showing an exemplary process for unlocking a lock function according to an embodiment of the disclosure.
Figure 5:
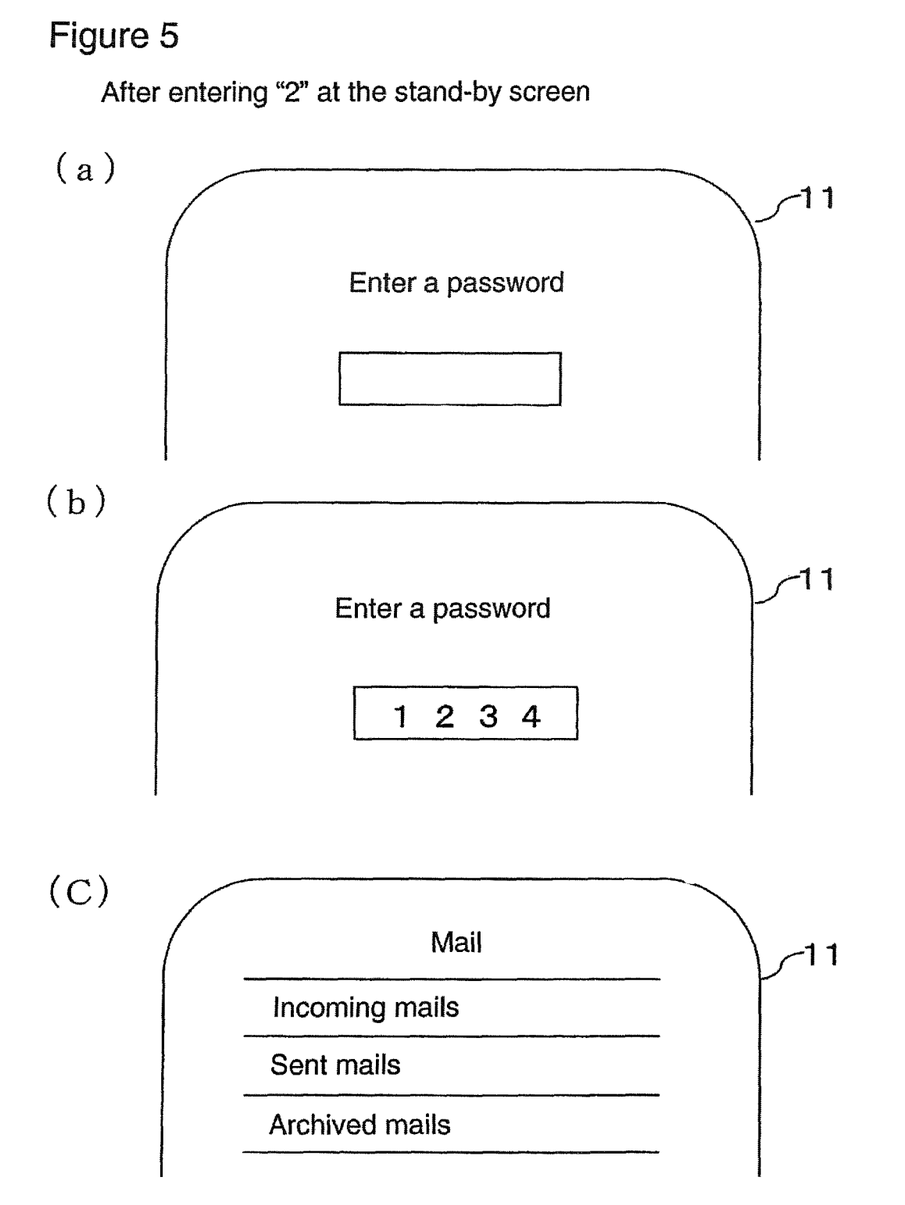
FIGS. 5(A)-(C) are illustrations showing an exemplary process for unlocking a lock function according to an embodiment of the disclosure.

FIG. 4 is a flowchart showing an exemplary process 400 for unlocking a lock function according to an embodiment of the disclosure.

Figure 6:
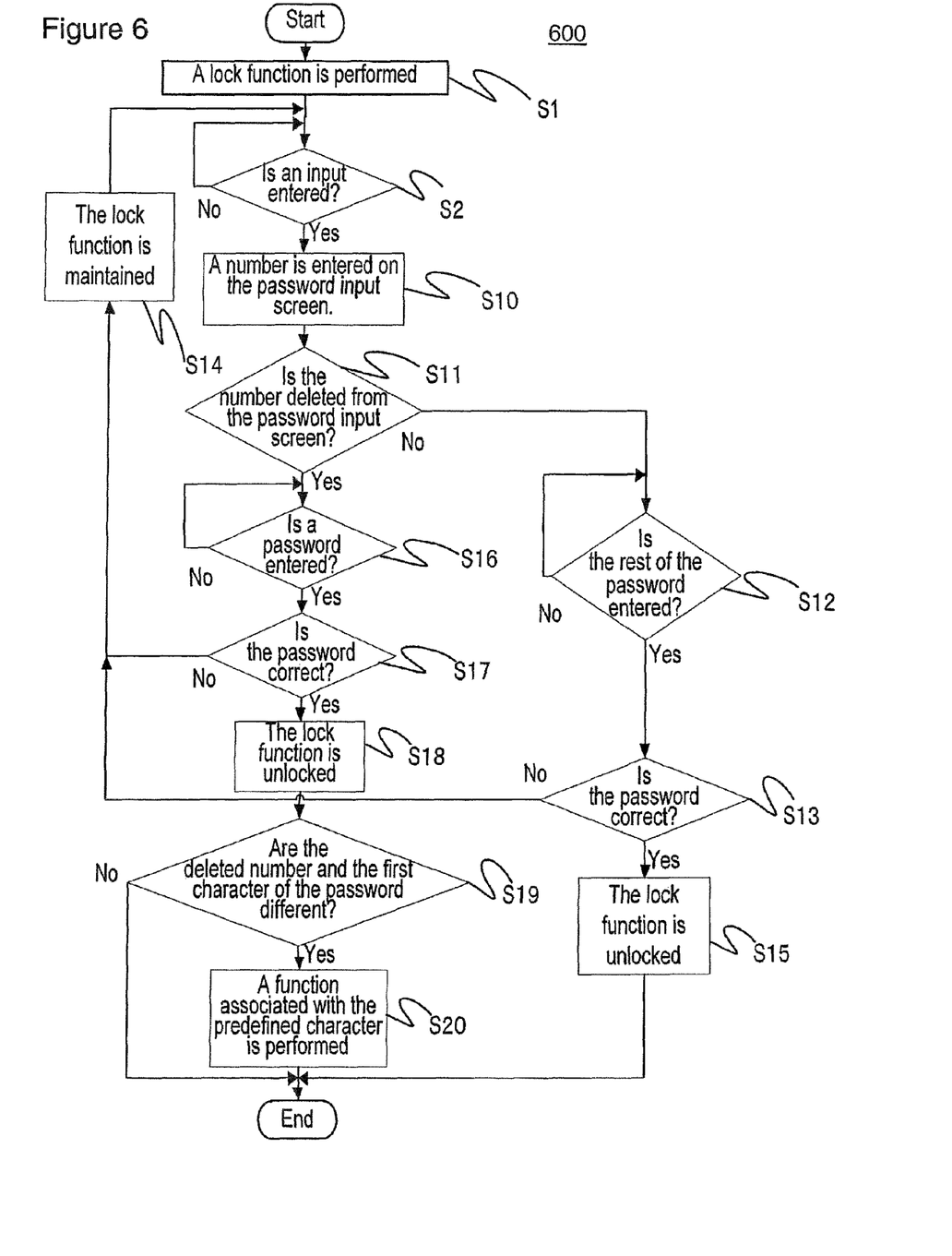
FIG. 6 is a flowchart showing an exemplary process for unlocking a lock function according to the embodiment of the disclosure.
Figure 7:
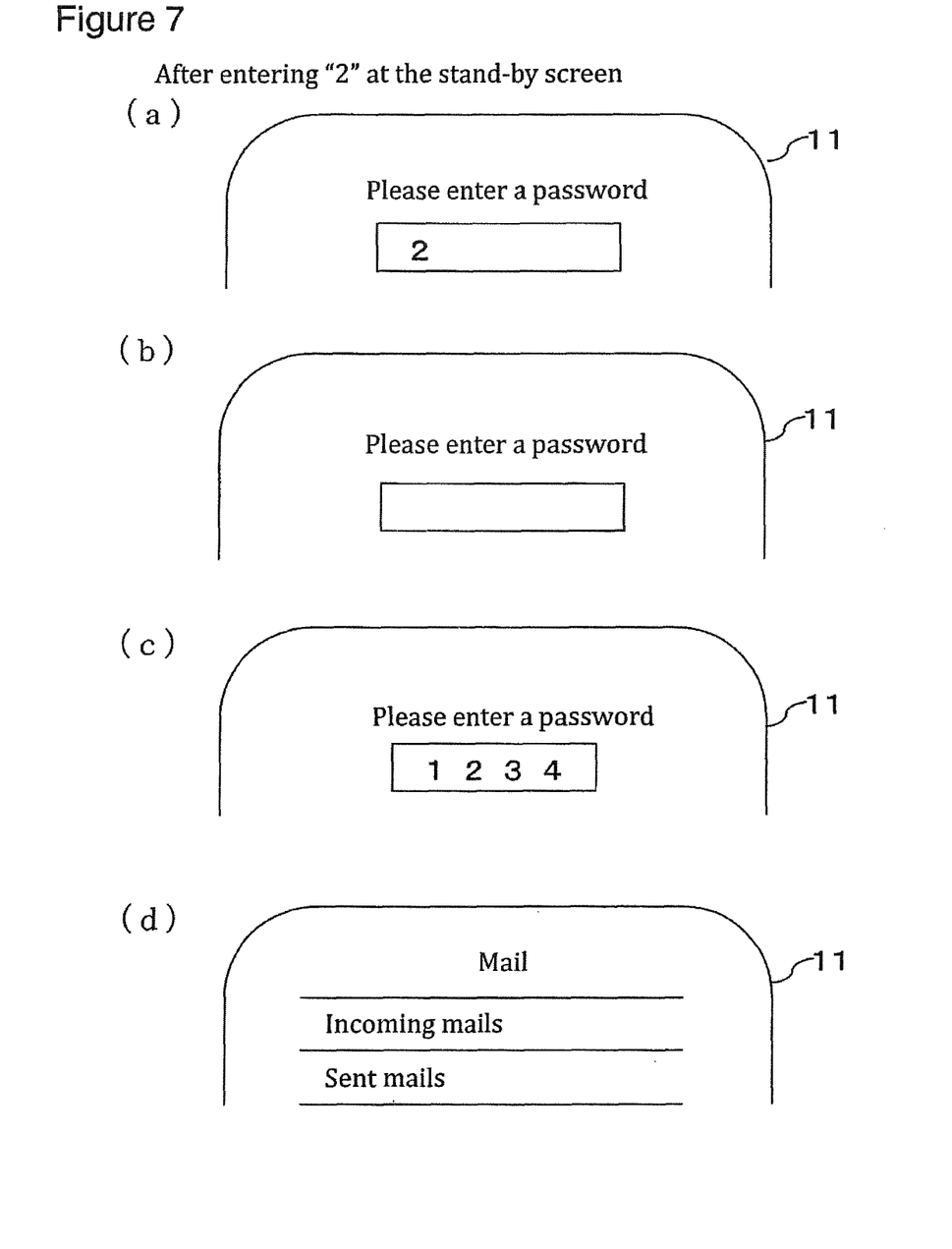
FIGS. 7(A)-(D) are illustrations showing an exemplary process for unlocking a lock function according to an embodiment of the disclosure.

FIG. 6 is a flowchart showing an exemplary process 600 for unlocking a lock function according to the embodiment of the disclosure.

When the controller 30 shown in FIG. 2 performs a lock function (Step S1), the controller 30 waits for an input (Step S2). In addition, the lock function may be set to be automatically performed when the mobile wireless terminal 100 is closed.

When an input is detected (Step S2: YES), a password input screen is displayed as shown in FIG. 5(A) (Step S3). This case is based on the premise that the function execution code, "2," for the "Mail," which is set up as shown in FIGS. 3(A)-(C), is entered at the stand-by screen.

As shown in FIG. 5(B), after a password is entered (Step S4: YES), the controller 30 determines if the password is correct or not (Step S5). If the password is not correct (Step S5: NO), the controller 30 maintains the lock function (Step S6) and returns to Step 2. If the password is correct (Step S5: YES), the controller 30 unlocks the lock function (Step S7). Although the entered password is indicated as a number in FIG. 5(B), in operation, it is displayed as "****" or the like from the aspect of privacy.

The controller 30 determines if a predefined character (a number, "2," in this instance) is entered before the entry of a password (Step S8). If a predefined character is not entered (Step S8: NO), the flow is terminated. If a predefined character is entered (Step S8: YES), a function associated with the predefined character is performed (Step S9). In this case, a screen for the "Mail" function, which is associated with the number "2", is displayed as shown in FIG. 5(C).

Some mobile wireless terminals may display a password input screen as a result of a user entering a character while a stand-by screen is displayed. In some cases, the mobile wireless terminals may enter the character the user enters as a first character of a password at the password input screen. Hereinafter, a specific example of such cases is described in conjunction with FIGS. 6 and 7.

Steps S1-S2 in FIG. 6 are similar to steps in FIG. 4, and therefore, the description is omitted. In the case of FIG. 6, when a user presses a numeric key, "2," at the stand-by screen, the number, "2," of a function execution code is entered as a first character at the password input screen as shown in FIG. 7(A) (Step S10). In reality, the number is displayed as "*" or the like from the aspect of privacy.

If the number "2" is entered at the password input screen, and if a first character of a password is not "2," a user is to delete the first character as shown in FIG. 7(B) and in Step S10 in FIG. 6. Thus, in the present embodiment, the controller 30 determines whether or not the number is deleted from the password input screen in Step S11.

If a password is entered without a deletion as shown in FIG. 7(C) (Step S11: NO, Step S12: YES), the controller 30 determines whether the password is correct or not (Step S13). If the password is not correct (Step S13: NO), the controller 30 maintains a lock function (Step S14). On the other hand, if the password is correct (Step S13: YES), the controller 30 unlocks the lock function and terminates the process (Step S15), assuming that a user enters "2" in order to enter a password.

If the number is deleted from the password input screen (Step S11: YES), a password is then entered (Step S16: YES). If the password is correct (Step S17: YES), the lock function is unlocked (Step S18).

The controller 30 determines whether a first number entered after unlocking the lock function is different from the first character of the password (Step S19). If different (Step S19, YES), the controller 30 performs a function associated with the predefined character (Step S9). In this case, the screen for the "Mail" function associated with the entered number "2" is displayed as shown in FIG. 7(D) (Step S20).

Otherwise, if the number first entered is same as a first character of a password (Step S19: NO), the deletion of the number from the password input screen in Step S11 is likely to be a user's error in operation. Therefore, the controller 30 terminates the process.

As described above, even if a user presses a key, failing to realize that a lock function is active, the user may start up a predefine function by entering a password without pressing the key again when a screen for prompting to enter a password is displayed. Thus, user-friendliness may be achieved.

In the above instance, the password input screen is started-up when a numeric key is pressed. However, the similar configuration may be applied to the case where two or more keys are pressed; for example, the password input screen may be started-up when a key other than a character key (for example, a menu key) is pressed and then a character key is pressed.

Figure 3:
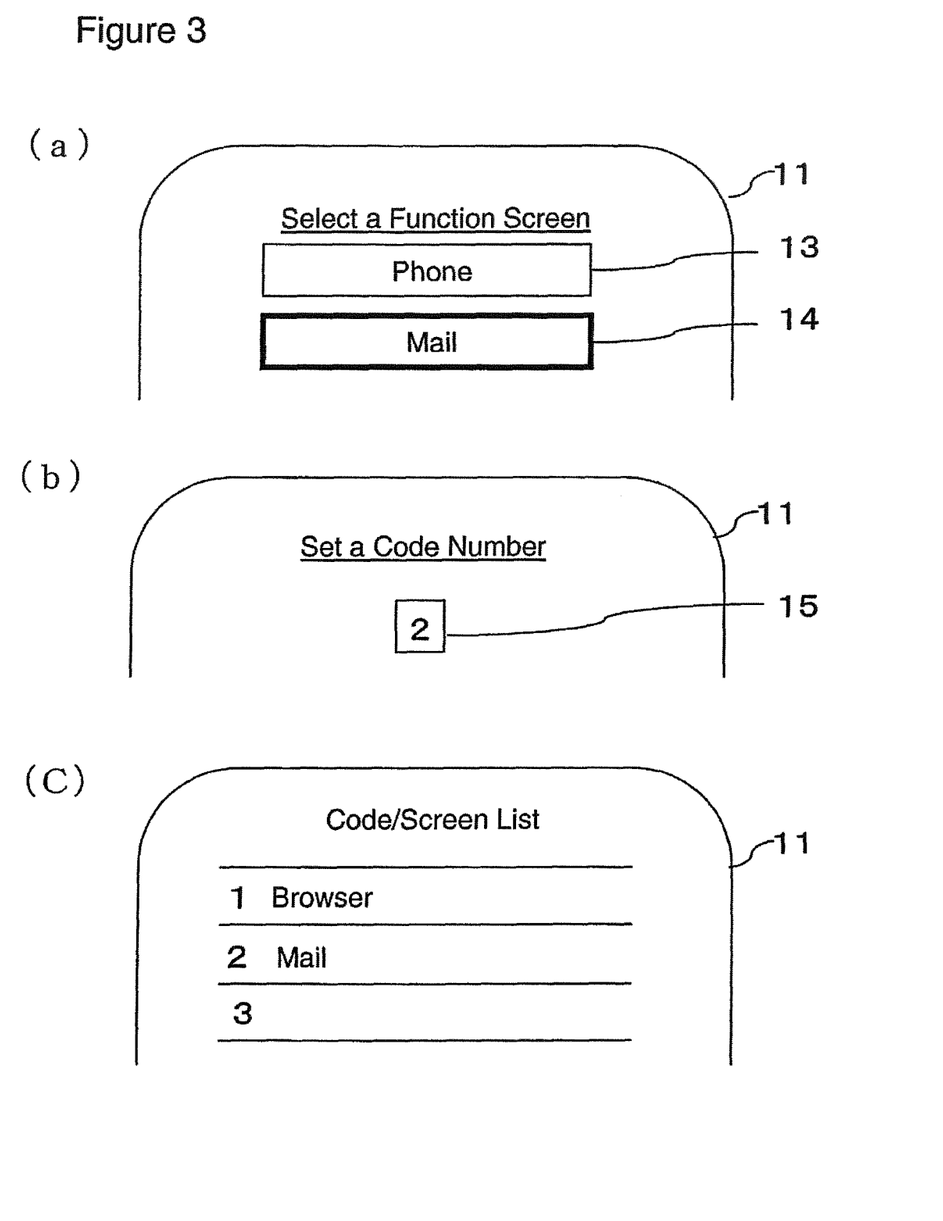
FIGS. 3(A)-(C) are illustrations showing an exemplary process for setting a function execution code according to the present disclosure.

In the embodiment 1, a user set a function execution code as shown in FIG. 3. However, a terminal may have a dedicated key that is assigned to a predefined function. As the embodiment 2 is hereinafter described, a short press and a long press of a key may be distinguished, and a predefined function may be assigned to a long press.

In the above described embodiment, the folding mobile wireless terminal 100 is taken as an example, and the configuration of entering a password or a code number with a hardware keyboard is described. However, it is needless to say that the similar configuration may be applied to a mobile wireless terminal with at least one touch panel, where a password or a code number is entered by using a software keyboard displayed thereon.

Instead of entering a password or a code number, a mobile wireless terminal including a touch panel may also employ a configuration of unlocking a lock function with a predefined touch operation by a pointing object, such as a finger or other objects.

Figure 8:
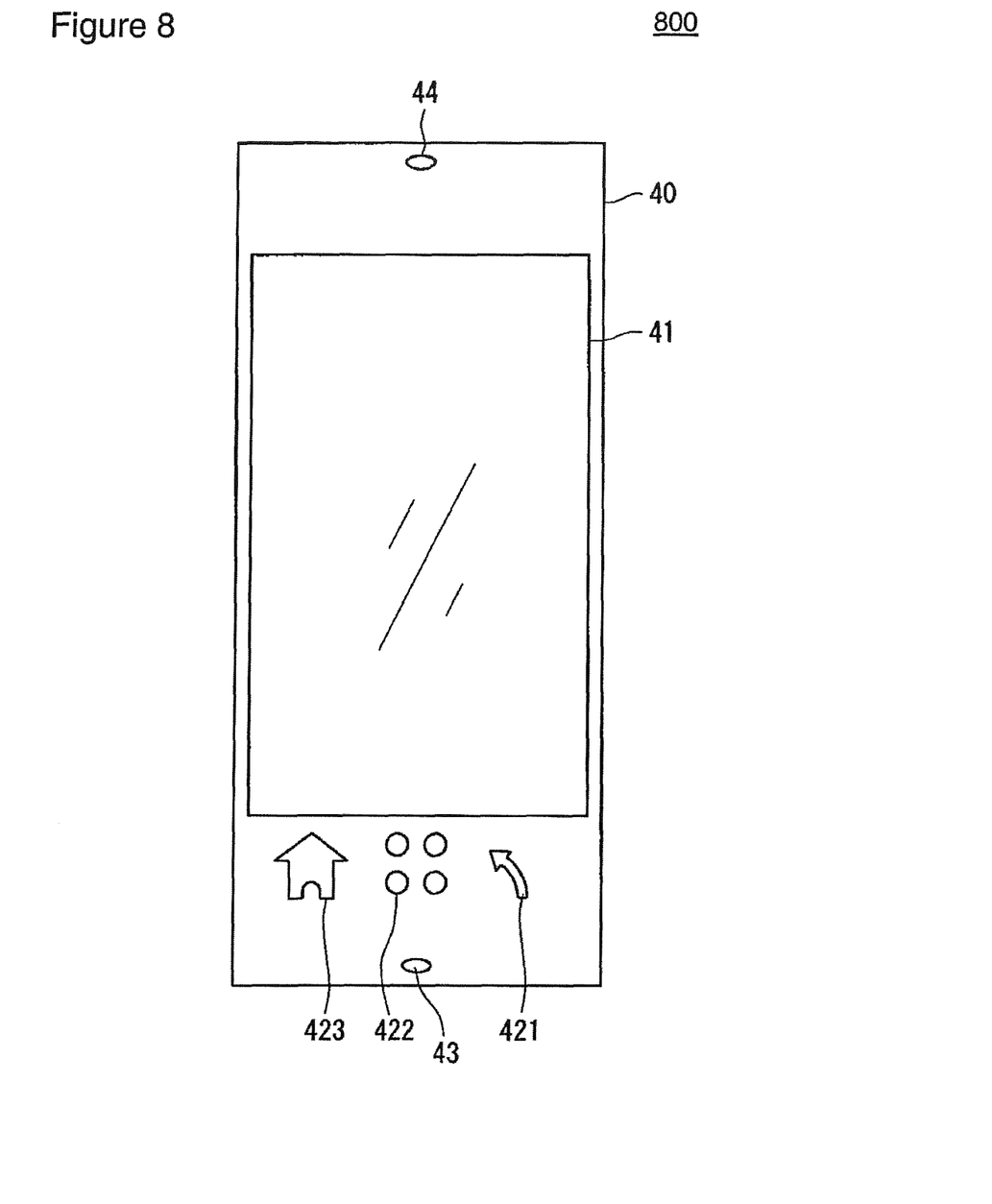
FIG. 8 is an illustration of an exterior view of an exemplary mobile wireless terminal according to the disclosure.

FIG. 8 is an illustration of an exterior view of an exemplary mobile wireless device including a touch panel according to the disclosure. A mobile wireless terminal 800 shown in FIG. 8 is a terminal with an exposed display 42 provided in a housing 40. FIG. 8 is an illustration of a top view thereof, seen from a side of a display 41 (display module).

A microphone 43 as an audio input module and a speaker 44 as an audio output module are provided on the surface where the display 41 is provided in the housing 40. The microphone 43 and the speaker 44 are located in a vicinity of the both edges of the vertically-long surface where the display 41 is exposed.

The display 41 is configured to display a plurality of keys realized by a touch panel. In the example of FIG. 8, a back key 421 for returning a previous screen, a menu key 422 for displaying a menu of options associated with respective screens, and a home key 423 for returning a home screen are displayed.

A touch panel for receiving a touch operation is located and disposed on the display 41 so as to overlap with the area of the display 41. The touch panel enables a dial keypad, an alphabet keyboard, and the like to function as a software keyboard on the display 41.

In addition, a controller (not shown) provided in the housing 40 controls the touch panel function running on the display 41. A user's operation performed by a pointing object, such as a finger or the like, is detected through the touch panel function by the touch panel and is output to the controller.

In the mobile wireless terminal 800 including such a touch panel, a process of unlocking a lock with a predefined touch operation by a pointing object, such as a finger or the like, is described by using FIGS. 9-12.

Figure 9:
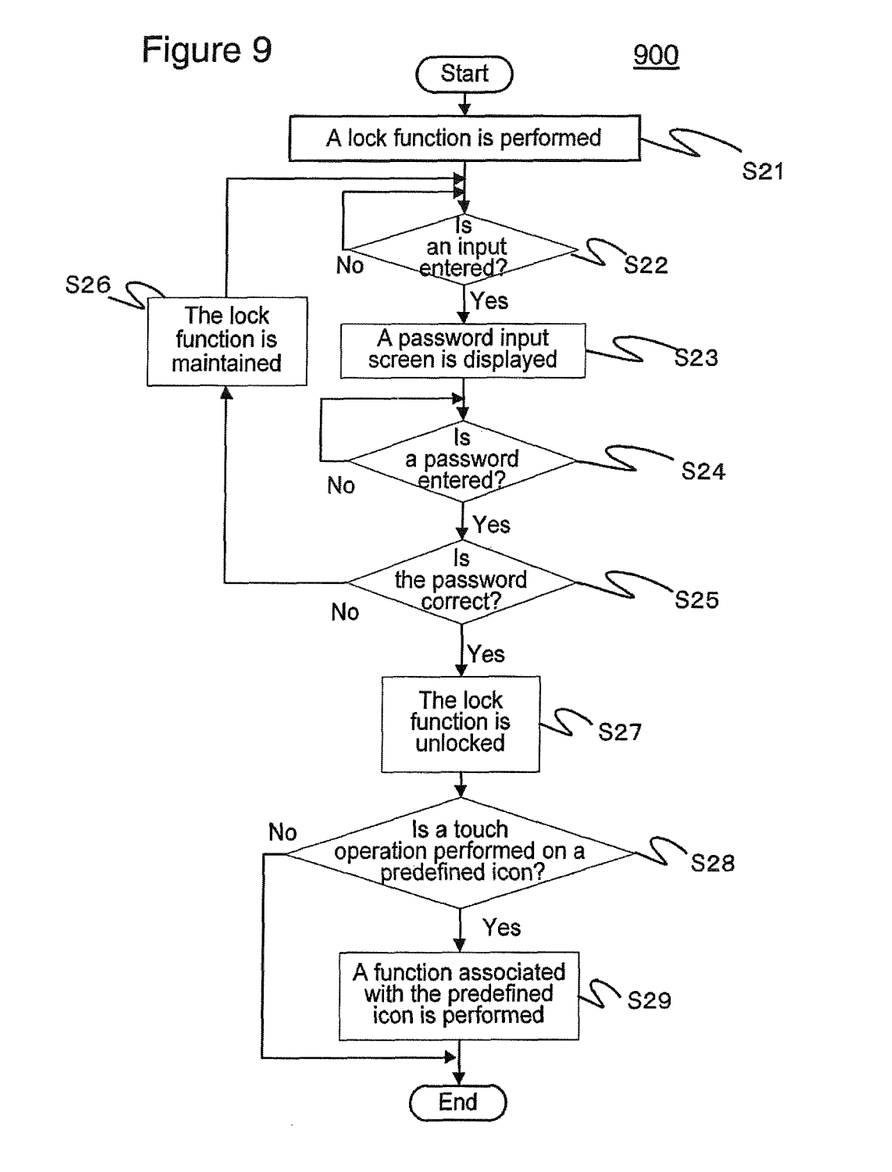
FIG. 9 is a flowchart showing an exemplary process for unlocking a lock function according to an embodiment of the disclosure.
Figure 10:
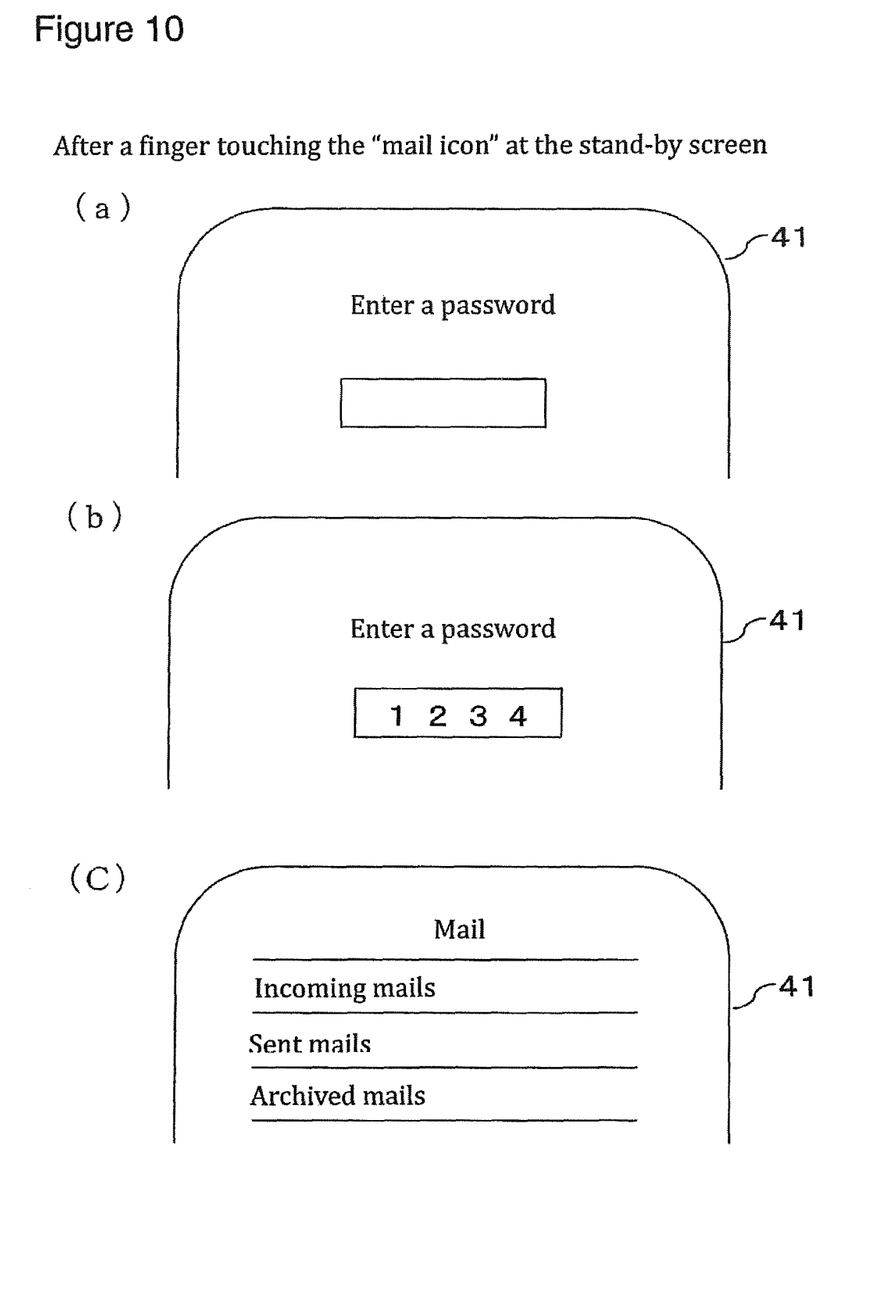
FIGS. 10(A)-(C) are illustrations showing an exemplary process of unlocking a lock function according to the embodiment of the disclosure.

FIG. 9 is a flowchart showing an exemplary process 900 for unlocking a lock function according to an embodiment of the disclosure.

After performing a lock function (Step S21), the controller 30 waits for an input entered by a touch (Step S22). If an input by a touch is detected (Step S22: YES), a password input screen is displayed as shown in FIG. 10(A) (Step S23).

This case is based on the premise that a mail icon is selected by a touch operation at the stand-by screen.

After a password is entered as shown in FIG. 10(B) (Step S24: YES), the controller 30 determines whether the password is correct or not (Step S25). If the password is not correct (Step S25: NO), the controller 30 maintains the lock function (Step S26) and returns to Step S22. If the password is correct (Step S25: YES), the controller 30 unlocks the lock function (Step S27).

Next, the controller 30 determines if a touch operation is performed on a predefined icon before the password is entered (Step S28). If no touch operation is performed on the predefined icon (Step S28: NO), the flow is terminated. In contrast, if a touch operation is performed on the predefined icon (Step S28: YES), a function associated with the predefined icon is performed (Step S29). In this case, a screen for the "Mail" function, which is associated with the mail icon of the predefined icon, is displayed as shown in FIG. 10(C).

Figure 11:
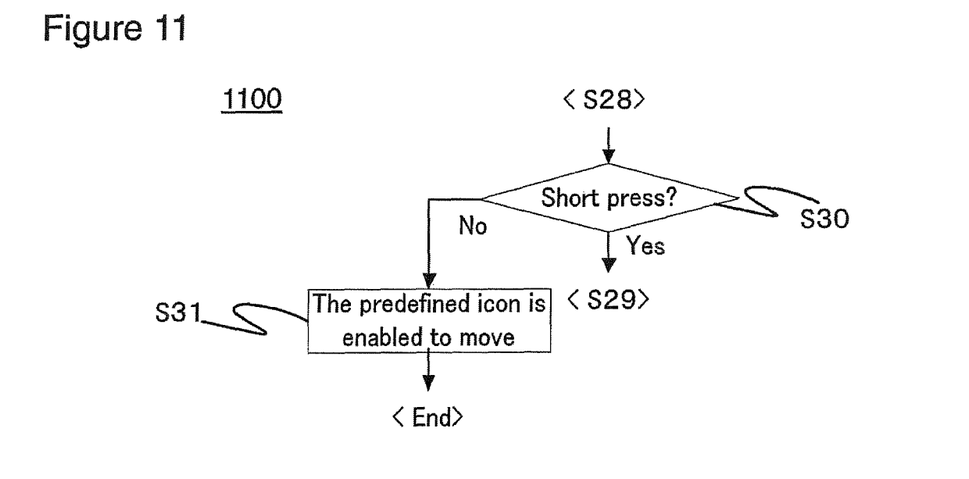
FIG. 11 is a flowchart showing an exemplary process of unlocking a lock function according to an embodiment of the disclosure.
Figure 12:
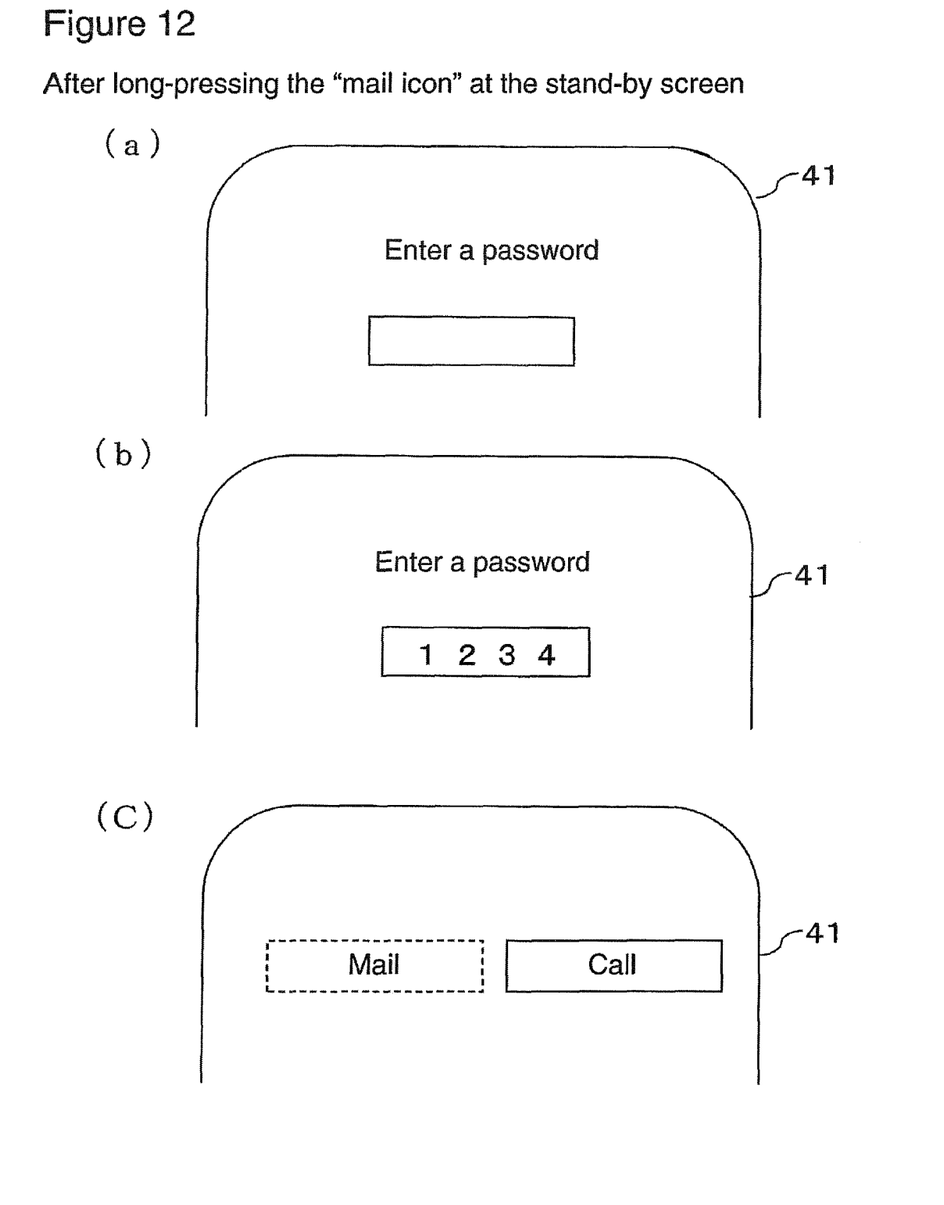
FIGS. 12(A)-(C) are illustrations showing an exemplary process of unlocking a lock function according to an embodiment of the disclosure.

Some mobile wireless terminals including a touch panel are known to determine whether a period-of-time before releasing a finger from a predefined icon after touching the icon with the finger or the like is within or exceeds a predefined period-of-time (whether or not it is a short press or a long press). FIG. 11 is a flowchart showing an exemplary process 1100 of unlocking a lock function according to an embodiment of the disclosure. In the present disclosure, as shown in FIG. 11, another step for determining whether or not a touch operation is a short press (Step S30) may be also added between Step S28 and Step S29 in FIG. 9. If the touch operation is a short press (Step S30: YES), the flow moves to Step S29 in FIG. 9. On the other hand, if the touch operation is not a short press, but a long press (Step S30: NO), the controller 30 enables a predefined icon, the mail icon in this example, to move (Step S31) as shown in FIG. 12(C) and terminates the process. In FIG. 12(C), a dashed line on the outer frame of the mail icon indicates that the icon is movable, but the present disclosure is not limited to the dashed line.

In the above described embodiment, selecting a function of an icon by a short press and moving an icon by a long press are described. However, they are nothing more than an example.

In the embodiment 2, a "short press" and a "long press" in the mobile wireless terminal 800 including a touch panel are described. However, the examples indicated in FIGS. 11 and 12 may also be applied to the mobile wireless terminal 100 including the input operation key 22 shown in the embodiment 1, when a "short press" and a "long press" are assigned to a different function process.

In this document, the terms "computer program product", "computer-readable medium", and the like may be used generally to refer to media such as, for example, memory, storage devices, storage unit, or other non-transitory media. These and other forms of computer-readable media may be involved in storing one or more instructions for use by the controller 30 to cause the controller 30 to perform specified operations. Such instructions, generally referred to as "computer program code" or "program code" (which may be grouped in the form of computer programs or other groupings), when executed, enable a method of using a system such as the mobile wireless terminal 100.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. An electronic device, comprising:
a controller operable to:
detect a touch input to a selected icon of a plurality of icons that are displayed on a touch display in a locked mode of the electronic device, each icon of the plurality of icons for opening a corresponding application of a plurality of device applications that is not a start-up menu application for unlocking the electronic device, the locked mode preventing access to the corresponding application of the selected icon and to the plurality of device applications;
display a password screen for entering a password when the touch input is detected on the selected icon during the locked mode;
if the password is correct then
switch the electronic device from the locked mode to an unlocked mode to permit access to the plurality of device applications; and
open the application that is associated with the selected icon in the unlocked mode.

2. The electronic device according to claim 1, wherein the controller is further operable to reactivate the lock function of the display module when the application associated with the selected icon is closed.

3. The electronic device according to claim 1, wherein the controller is further operable to:
open the application that is associated with the selected icon according to the touch input, if a period-of-time when the touch display module detects the touch input on the selected icon is within a predefined period-of-time, and if the correct password is entered; and
move the selected icon if the period-of-time exceeds the predefined period-of-time, and if the correct password is entered.

4. A method for operating an electronic device, comprising:
activating a lock mode to the electronic device, the lock mode to lock access to a plurality of applications comprising an each application corresponding to an icon of a plurality of icons displayed on a touch display of the electronic device, and wherein the each application is not a start-up menu application;
receiving an input selection, during the lock mode, of a selected icon of the plurality of icons;
receiving a password after the input selection of the selected icon;
deactivating the lock mode to the electronic device and to the plurality of applications if the password is correct; and
opening the application corresponding to an unlocked mode of the selected icon if the password is correct.

5. The method according to claim 4, further comprising:
opening the application according to the input selection if a period-of-time when the touch display receives the input selection on the selected icon is within a predefined period-of-time, and if the correct password is received; and
moving the selected icon if the period-of-time exceeds the predefined period-of-time, and if the correct password is received.

6. A non-transitory computer readable storage medium comprising computer-executable instructions for operating a mobile electronic device, the computer-executable instructions comprising:
activating a lock mode to the mobile electronic device, the lock mode to lock access to a plurality of applications comprising applications associated with a plurality of icons displayed on a touch display of the mobile electronic device, wherein the displayed plurality of icons does not include a start-up menu icon;

receiving a touch input, during the lock mode, on a selected icon of the plurality of icons, the icon corresponding to a first application of the plurality of applications associated with the selected icon;

receiving a password;

deactivating the lock mode to the mobile electronic device to unlock the plurality of applications comprising the first application, if the touch input is received and if the password is correct; and displaying the first application on the touch display, if the touch input is received and if the password is correct.

7. The non-transitory computer readable storage medium of claim 6 further comprising computer-executable instructions comprising running the first application.

8. The non-transitory computer readable storage medium of claim 6 further comprising computer-executable instructions comprising when the application is locked:

performing the application according to the touch input, if a period-of-time when the touch display receives the touch input on the selected icon is within a predefined period-of-time, and if the correct password is received; and moving the selected icon if the period-of-time exceeds the predefined period-of-time, and if the correct password is received.

* * * * *